DE WITT NELSON.
TRACTION BELT.
APPLICATION FILED SEPT. 11, 1915.
1,230,504.
Patented June 19, 1917.
2 SHEETS—SHEET 1.
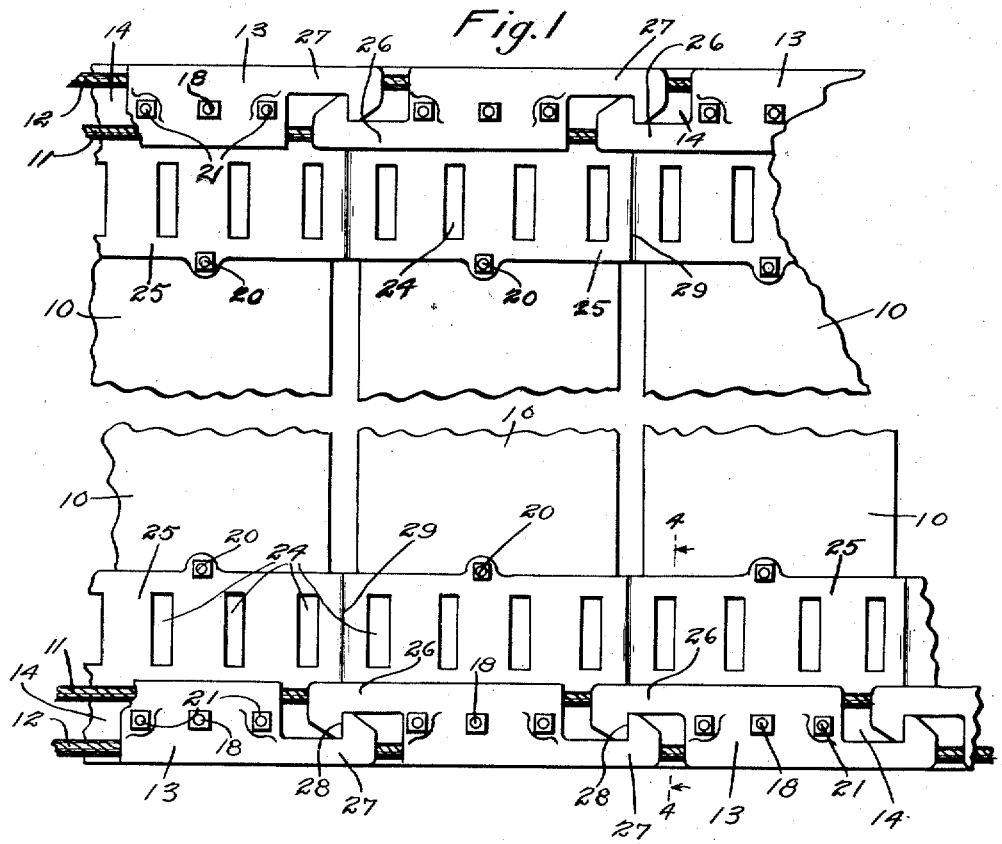
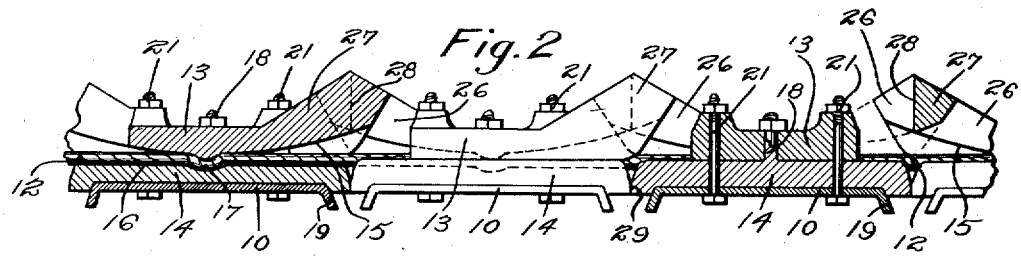
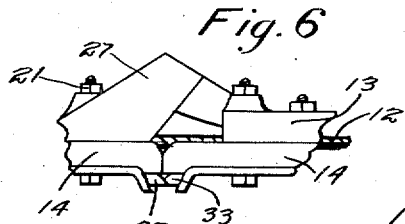
Witnesses:
Alex. Fagard
H. A. Bowman
Inventor:
DeWitt Nelson
By H. A. Whiteley
his Attorney

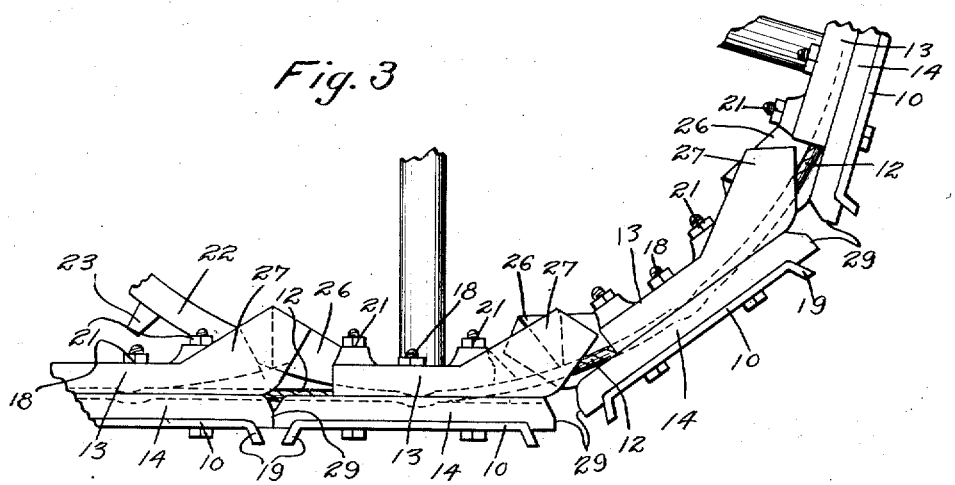

UNITED STATES PATENT OFFICE.

DE WITT NELSON, OF MINNEAPOLIS, MINNESOTA, ASSIGNOR TO TOM THUMB TRACTOR COMPANY, OF MINNEAPOLIS, MINNESOTA, A CORPORATION.

TRACTION-BELT.

1,230,504.   Specification of Letters Patent.   Patented June 19, 1917.

Application filed September 11, 1915. Serial No. 50,123.

*To all whom it may concern:*

Be it known that I, DE WITT NELSON, a citizen of the United States, residing at Minneapolis, in the county of Hennepin and State of Minnesota, have invented certain new and useful Improvements in Traction-Belts, of which the following is a specification.

My invention relates to traction belts such as are employed in what is known as the caterpillar type of traction engine, and has for its object to provide a caterpillar belt which will drive equally well in either a forward or backward direction. In the ordinary form of caterpillar belt the same is usually made very flexible and when it travels in a forward direction tension between the elements in contact with the earth exists, thus affording sufficient gripping contact with the earth throughout the whole underside of the belt. When the direction of travel is reversed the elements of the belt in contact with the earth are subjected to compression and hence due to their flexibility of attachment tend to buckle away from the earth to such an extent that contact is only secured directly under the wheels, thus decreasing the tractive power of the belt. My invention overcomes this difficulty by providing the belt elements with interlocking means whereby the same when in a straight position forms a rigid plate such that the compression transmitted to the lower portion of the belt in traveling backward may be directly taken up by that portion of the belt without causing the belt to buckle, thus securing gripping contact with the earth along the entire surface of the belt exposed to the earth. This interlocking means on the belt elements is so devised that the members thereof unlock when the belt is traveling about the wheels, thus providing suitable flexibility for that purpose and sufficient rigidity when it is traveling in a straight line.

The full objects and advantages of my invention will appear in connection with the detailed description thereof and are particularly pointed out in the claims.

In the drawings, illustrating the application of my invention in one form,—

Figure 1 is a plan view of a portion of my improved caterpillar belt showing the same in a straight extended position. Fig. 2 is an elevational view of the parts shown in Fig. 1 with some of them in section. Fig. 3 is a view similar to Fig. 2 of the belt passing over a portion of one of the pulleys. Fig. 4 is a transverse section of the belt taken on line 4—4 of Fig. 1. Fig. 5 is a view similar to Fig. 2 with some of the parts in relatively shifted positions. Fig. 6 is an elevational view of a modification of the device shown in Fig. 5. Fig. 7 is an elevational view of a modification of the belt shown in Fig. 2.

My improved caterpillar belt, as shown in the preferred form in Figs. 1, 2, 3, 4 and 5, comprises a plurality of transverse slats 10 attached at each end to a pair of cables 11 and 12 by a like number of clamping blocks 13 and 14 bolted thereto. These clamps are provided with semicircular grooves 15 and 16 through which cables 11 and 12 pass, said grooves being kinked at 17 to rigidly grip said cables. A bolt 18, integral with block 14, passes through block 13, serving to firmly grip the said cables and hold them in place. The slats 10, as best seen in Fig. 2, are provided with depending fins 19 for taking hold upon the ground and are fastened to clamp blocks 13 and 14 by means of bolts 20 passing through blocks 14 and by means of bolts 21 passing through both blocks 13 and 14. It can thus be seen that suitable means are provided whereby said slats may be readily removed from the belt without disconnecting the same.

The belt thus described rides at each end upon a pair of sprocket wheels 22, said sprocket wheels being provided with teeth 23 engaging in holes 24 passing through extended portions 25 of clamp blocks 14 and through the slats 10, the rim portion of said sprocket wheels resting upon said extended portions 25. Grooves 16 in blocks 14 are formed straight, while grooves 15 in blocks 13 are formed in an arc of a circle the radius of which is equal to the radius of the lesser sprocket wheel. It hence becomes evident that cables 11 and 12 as the belt mounts the sprocket wheels recede from groove 16 to conform to the outline of grooves 15, thus allowing the belt to travel over said sprockets without affecting the length of the cables and hence insuring a smoothly-running, positively-driven belt.

Each of clamp blocks 13, as clearly shown in Figs. 1 and 2, is provided with a forwardly-projecting hook-like lug 26 at one end thereof and a similar rearwardly-projecting hook-like lug 27 at the other end thereof, lug 27 of one clamp being adapted to engage with lug 26 of the next clamp, and so on throughout the whole length of the belt, so that when the belt is perfectly straight the contacts 28 between the hook portions of these lugs are just made and the edges 29 of the lower blocks 14 just touch. This has the effect of producing a rigid plate which can collapse in one transverse direction. The lower portion of the belt which comes in contact with the ground is hence prevented from receding away from the ground and so tractive power can effectively be transmitted by compression through said belt, the surface of contact extending over the whole portion of the belt exposed to the ground. The upper portion of the belt will also remain in a straight line, as becomes obvious as the direction of collapsibility of the belt is opposite to the direction in which the belt would tend to sag, due to gravity. Another desirable feature with this form of belt is the fact that in the straightened position all of the strain is removed from the cables and taken up by the individual members.

To prevent the belt parts from clogging up with dirt, especially between the edges 29 of clamp blocks 14 as the same close together in straightening out after leaving the sprocket wheels, a limited lateral shifting of the slats and clamps attached thereto relative to each other is provided, as shown in Fig. 5. The surfaces of contact 28 of the lugs 26 and 27 are made flat and perpendicular to the plane of slats 10 so that each lug may slide on the surface 28 in that plane. A portion 30 of said lugs 26 and 27 is caused to project out beyond the clamp block 14 and to engage a portion 31 of said clamp block lugs 27, limiting the upward motion, and lugs 26 the downward relative motion of the slats. Both these portions are rounded so that a binding or catching effect is impossible. When dirt gets between said edges 29 the same can hence be removed through the grinding action as the slats slide as described. The same action is also advantageous when a slight obstruction is encountered in the path of the belt, a slat having a very slight yielding action above said obstruction without lifting the whole machine, the rigid caterpillar riding upon the tops of all the large obstructions without bouncing up and down in and over the hollows and ridges, as would be the case with an ordinary caterpillar belt.

Fig. 6 provides another method of limiting the sliding indicated in Fig. 5. A lug 32 is attached to one end of each of clamp blocks 14 and another lug 33 to the other end of each of said clamp blocks in such a position that when the belt is assembled each set of lugs projects beyond its respective fastenings in a manner similar to the portions 30 mentioned in the preferred form and acts in a similar manner. This form has the advantage of disengaging when the belt passes about the sprocket wheels.

The entire sets of hooks 27 and 26, heretofore described, may be dispensed with by the adoption of the device shown in Fig. 7. In this case the ends of the upper clamp blocks 37 are curved at 35 and roll against a washer 36. The nature of curve 35 is such that in whatever position the belt may be the length of the cables 38 between the points of attachment must be equal. The lower clamp blocks 39 are left straight at 40 and the device, as clearly shown, is adapted to have lateral collapsibility or bending in one direction and is adapted to be subjected to compression in a manner analogous to the method brought out in the preferred form. In this form the cable carries all the tensile stresses, which are taken up by hooks 26 and 27 in the preferred form.

My invention has unlimited application to devices for tractive purposes as set forth and may be used in connection with belt conveyers and similar devices where a traveling endless upper surface of rigid character is required, thus eliminating undue strain in a line connecting the axes of support and dispensing with numerous idler supports or the like.

I claim:

1. A traction belt for caterpillar type traction engines comprising a plurality of slats, pairs of blocks positioned on said slats, there being grooves in said blocks, a cable passing through said grooves in the blocks, and means within the grooves engaging said cable to distort the same for preventing the slats from slipping on the cable, and means for securing the blocks together upon the slats.

2. A traction belt for caterpillar type traction engines comprising a plurality of slats, pairs of blocks positioned on said slats, there being grooves in said blocks one having a projection and the other a corresponding depression, a cable passing through said grooves in the blocks and adapted to be distorted by the projection into the depression, and means for clamping the blocks together upon the slats to hold the parts in place upon the cable.

3. A traction belt for caterpillar type traction engines comprising a number of ground-engaging members, means for interconnecting said members to permit the belt to bend in one direction and to remain in alinement against pressure in the opposite direction, said means including overlapping pieces having reduced portions for permitting the individual slats to have relative transverse movement when the belt is in its alined position without disturbing the general alinement of the other members.

4. A traction belt for caterpillar type traction engines comprising a plurality of ground-engaging members, flexible means for connecting said members together for relative oscillation, and similarly-formed hooks on said members for holding them in rigid alinement from movement in one direction.

5. A traction belt for caterpillar type traction engines comprising a plurality of cables, a plurality of plates extending adjacent one another across said cables, and means for securing said plates to the cables, said securing means comprising hooks which overlap and coact along the line of joinder between the plates and hold the plates rigidly interconnected in a common plane against pressure in one direction.

6. A traction belt for caterpillar type traction engines comprising a plurality of plates extending side by side and with the edges thereof in close proximity, a cable passing over said plates adjacent each end thereof, a pair of members secured to the ends of each plate and clamping the cable between the same for flexibly securing the belt to the cable, one of said members at the ends of each plate having hooks which overlap and coact along the line of joinder between the plates and hold the plates rigidly interconnected in a common plane against pressure in one direction, and the other of said members having a series of lug-receiving sockets, and sprocket driving wheels having lugs engageable in said sockets.

In testimony whereof I affix my signature in presence of two witnesses.

DE WITT NELSON.

Witnesses:
F. A. WHITELEY,
H. A. BOWMAN.